United States Patent
Burnett

[15] 3,653,831
[45] Apr. 4, 1972

[54] AMMONIA SYNTHESIS CATALYST

[72] Inventor: Robert L. Burnett, Pinole, Calif. 94564
[73] Assignee: Chevron Research Company, San Francisco, Calif.
[22] Filed: Oct. 4, 1968
[21] Appl. No.: 774,563

[52] U.S. Cl..............................23/199, 23/198, 252/466 B
[51] Int. Cl...........................................C01c 1/04
[58] Field of Search..............252/466, 473, 474; 23/198, 23/199

[56] References Cited

UNITED STATES PATENTS

| | | | |
|---|---|---|---|
| 1,148,570 | 8/1915 | Bosch | 23/199 |
| 1,489,497 | 4/1924 | Larson | 23/199 |
| 1,510,598 | 10/1924 | Larson | 23/199 |
| 1,667,323 | 4/1928 | Larson | 23/199 |

Primary Examiner—Daniel E. Wyman
Assistant Examiner—Philip M. French
Attorney—A. L. Snow, F. E. Johnston, O. J. Tonkin and T. G. De Jonghe

[57] ABSTRACT

An improved ammonia synthesis catalyst containing platinum.

5 Claims, 1 Drawing Figure

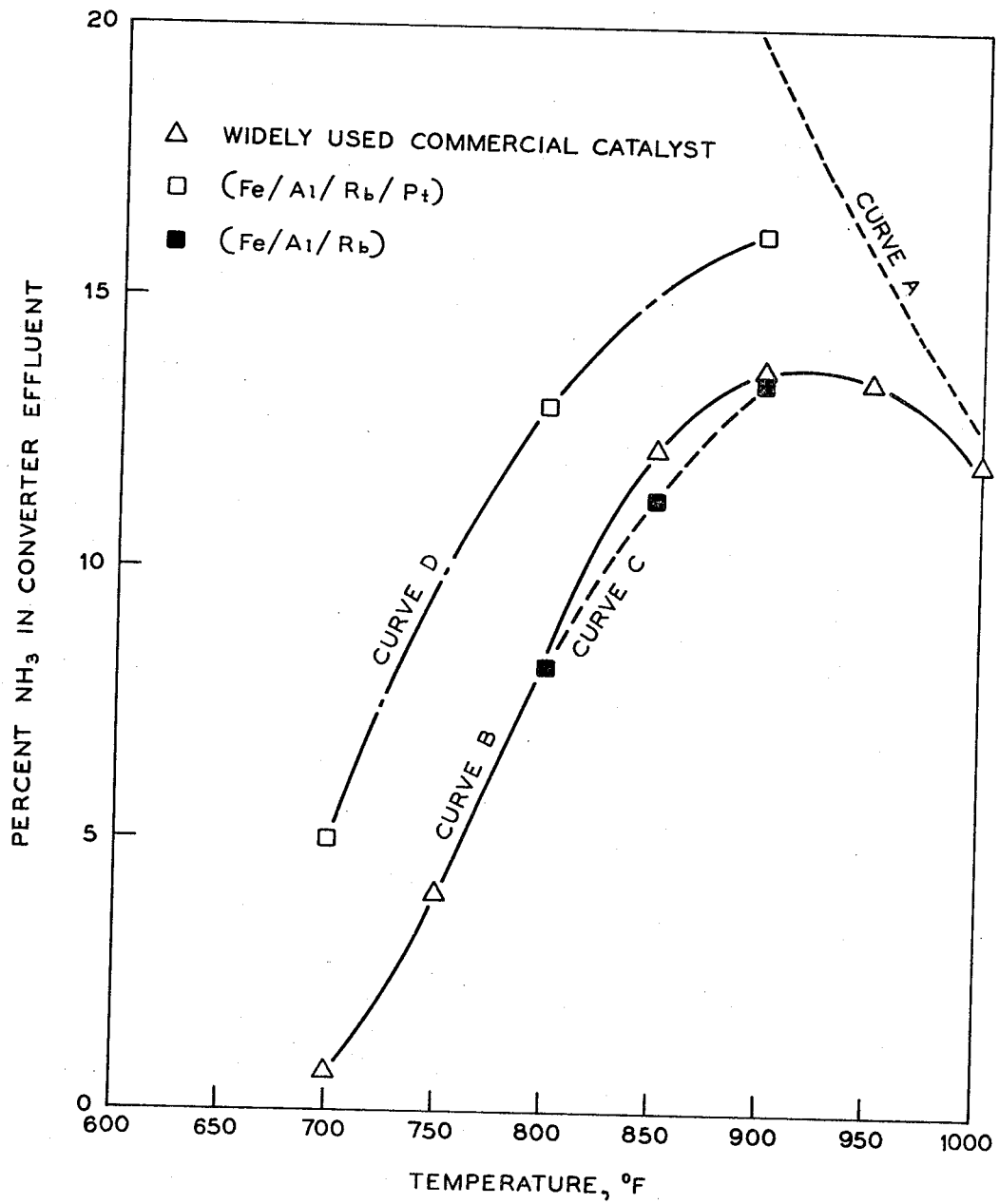

AMMONIA SYNTHESIS CATALYST

BACKGROUND OF THE INVENTION

1. Field of the Invention

The present invention is concerned with improved catalysts for synthesizing ammonia.

2. Description of the Prior Art

Essentially all catalysts used for ammonia synthesis contain iron. All over the world, presently, catalysts used for ammonia synthesis are prepared in substantially the same way. Pure iron is burned to magnetite ($Fe_3O_4$) which together with small amounts of promoter materials is fused electrically. Sometimes natural magnetite is also added. After the material is left to cool, it is crushed to the desired size. Subsequently particles are loaded into the ammonia synthesis column (generally referred to as the converter) and the iron oxide is reduced to a substantial extent. The promoters usually present in the ammonia synthesis catalyst generally consist of metal oxides of a high melting point, which metal oxides are not reduced by this treatment. The favorable effect of the promoters is sometimes said to be ascribable either to the stabilizing of the large accessible surface area or to increasing the specific activity of the catalytic surface.

The ammonia synthesis catalysts are generally promoted with 1 to 4 oxides. Promoted catalysts thus may have the following oxides at the time of manufacture:

| Singly promoted | $Al_2O_3$ |
| --- | --- |
| Doubly promoted | $Al_2O_3$, $K_2O$ |
| Triply promoted | $Al_2O_3$, $K_2O$, CaO |
| Quadruply promoted | $Al_2O_3$, $K_2O$, CaO, MgO |

Catalysts such as the $Fe$-$Al_2O_3$-$K_2O$-CaO catalyst frequently contain about 0.5 percent silica as an impurity. More recently catalysts have been purposefully made to contain silica together with the usual activators, alumina, potassium oxide and calcium oxide, have recently become more important. Thus, a Bulgarian catalyst, designated K–31, contains 3.9 percent $Al_2O_3$, 1.8 percent $K_2O$, 2.3 percent CaO, 0.4 percent MgO and and 0.8 percent $SiO_2$.

According to an article by H. Hinrichs, BRITISH CHEMICAL ENGINEERING, Nov. 1967, Vol. 12, No. 11, Pages 1745–1746, known metal oxide promoters for ammonia synthesis catalyst are: $Al_2O_3$, $K_2O$, $Li_2O$, $Na_2O$, $Cs_2O$, BeO, MgO, CaO, SrO, BaO, $B_2O_3$, $La_2O_3$, $SiO_2$, $ThO_2$, $ZrO_2$, CcO, $TiO_2$. According to Dr. Hinrichs, who has worked on ammonia synthesis for more than 15 years, apart from $Al_2O_3$ and $K_2O$ the only promoters of practical importance are MgO and $SiO_2$, and even as to these promoters Hinrichs states that they increase stability at high temperatures and have resistance to poisoning, but at the penalty of reduced catalyst activity.

In U.S. Pat. No. 1,148,570 there is a disclosure of a large number of elements of the Periodic Table, namely, magnesium, beryllium, aluminum, cerium, lanthanum, erbium, neodymium, praseodymium, samarium, yttrium, ytterbium, and further potassium, rubidium, caesium, sodium, lithium, strontium, barium, calcium, uranium, thorium, zirconium, vanadium, niobium, tantalum, chromium, manganese, molybdenum, and tungsten (Page 2, lines 14–22).

Similarly, U.S. Pat. No. 1,926,099 discloses a large number of elements of the Periodic Table which may be base exchanged into the ammonia synthesis catalyst, such as: copper, silver, gold, ammonium, beryllium, calcium, manganese, caesium, potassium, sodium, zinc, strontium, cadmium, barium, lead, aluminum, scandium, titanium, zirconium, tin, antimony, thorium, vanadium, lithium, rubidium, thallium, bismuth, chromium, uranium, manganese, iron, cobalt, nickel, ruthenium, palladium, platinum and cerium (Page 4, lines 122–129).

Although both of these patents have a "shotgun" disclosure of rubidium, neither of these patents indicate any particular advantage in the use of rubidium and can scarcely be considered any more a disclosure of rubidium for ammonia synthesis catalyst than the Periodic Table is a disclosure of rubidium for ammonia synthesis catalyst.

In U.S. Pat. No. 3,253,887, a zeolite catalyst for ammonia synthesis is disclosed. U.S. Pat. No. 3,253,887 states that the preferred crystalline aluminosilicate zeolites contain substantial portions of Groups IB, IIA, IIIA and VIII metal cations, mixtures of zeolites containing these particular cations or zeolites containing more than one cation. Zeolites which contain Group VI-B, VII-B, actinide, and lanthanide cations may also be used. Examples of suitable cations according to U.S. Pat. No. 3,253,887 are: copper, silver; magnesium, calcium, strontium, barium; aluminum, gallium, molybdenum, tungsten; cobalt, nickel, iron, platinum, palladium, osmium, ruthenium, manganese, uranium, and cerium (Column 2, lines 34–39). No particular advantage is attributed to the use of platinum. Also, the patent disclosure is directed to base exchanged aluminosilicate zeolites as catalyst for the synthesis of ammonia as opposed to, for example, ammonia synthesis catalyst prepared by iron fusion or by cogelation.

SUMMARY OF THE INVENTION

According to the present invention an improved catalyst is provided for ammonia synthesis which catalyst is comprised of iron, an oxide of a Group II–A, or III–A metal, an alkali metal oxide, and platinum.

Preferably the oxide of the Group II–A or III–A metal is alumina. Also it is preferred that the alkali metal be rubidium. As is indicated in more detail hereinbelow and in my concurrently filed application directed to ammonia synthesis catalysts containing rubidium for ammonia synthesis, it has been found that catalysts containing rubidium have surprisingly good activity for ammonia synthesis and in many cases the activity is even better than that of presently widely used commercial catalysts containing potassium and not rubidium.

It is preferred that the catalysts according to the present invention contain between 0.01 and 2.0 weight percent platinum, still more preferably, between about 0.1 and 2 weight percent platinum, for example, about .1 weight percent platinum.

Preferably, the ratio on an atom basis of iron to aluminum to rubidium in the catalyst is between 80 and 120 atoms of iron to between 4.3 and 6.3 atoms of aluminum to between 1.7 and 3.7 atoms of rubidium. For example, it has been found that a catalyst containing about 100 atoms iron to 5.3 atoms aluminum to 2.7 atoms rubidium together with about 1.0 weight percent platinum is a particularly attractive catalyst from the standpoint of high activity and reasonably low fouling rate. Also, it has been found that very active ammonia synthesis catalysts are obtained when the catalyst is prepared by cogelation of iron and aluminum compounds. Thus, an ammonia synthesis catalyst according to the present invention may be prepared by cogelation of iron and aluminum compounds followed by impregnation of an alkali metal compound onto the support comprised of iron and aluminum and also impregnation onto said support of a metal selected from the group consisting of platinum, palladium and nickel.

BRIEF DESCRIPTION OF THE DRAWING

The drawing shows the percent ammonia formed as a function of temperature when passing a 3 to 1 molar ratio of hydrogen to nitrogen through a converter having (1) a widely used commercial catalyst (no platinum) or (2) an iron-aluminum oxide-rubidium oxide catalyst or (3) an iron-aluminum oxide-rubidium oxide-platinum catalyst.

EXAMPLES AND DETAILED DESCRIPTION

A number of catalysts having a composition as approximately indicated in Table I were tested for ammonia synthesis activity.

TABLE I

EXPERIMENTAL CATALYSTS

| Catalyst | % NH$_3$ in the Converter Effluent at 900° F. | Composition (% is by weight) |
| --- | --- | --- |
| 1 | 1.2 | 21.8% Fe on Al$_2$O$_3$ |
| 2 | 1.9 | 5–9% Mo on Catalyst 1 |
| 3 | Low, unstable activity declining to zero | Fe$_4$(Fe[Cn]$_6$)$_3$ |
| 4 | Low, unstable activity declining to zero | |
| 5 | Low, declining activity | Fe$_4$(Fe[Cn]$_6$)$_3$ + Al$_2$O$_3$ |
| 6 | No activity | MgO—NiO |
| 7 | No activity | Al$_2$O$_3$—NiO |
| 8 | No activity | 4% Pt on Commercial Reforming Catalyst Base |
| 9 | No activity | 2% Pt on SiO$_2$ |
| 10 | No activity | ZnO—CrO$_4$ Methanol Catalyst |
| 11 | No activity | CuO + Fe$_2$O$_3$ |
| 12 | No activity | UO$_2$ + SiO$_2$ |
| 13 | No activity | 5% Ru on Al$_2$O$_3$ |
| 14 | No activity | NiFe$_2$O$_4$ |
| 15 | No activity | CoFe$_2$O$_4$ |
| 16 | No activity | 9.5% Fe + 11.1% Co on Al$_2$O$_3$ |
| 17 | ≈1.0, Declining | Re on Commercial Reforming Catalyst Base |
| 18 | 5.2 | Fe from Fe(OH)$_3$ + 5% Al$_2$O$_3$ |
| 19 | ≈1.3, Declining | 17% Re on Commercial |
| 20 | 0.2 at 950° F. | 3% Fe on Hydrogen Y Zeolite |
| 21 | ≈2.0, Declining | Fe on MgO |
| 22 | 11.0 | Fe + 5% Al$_2$O$_3$ + 3% K$_2$O |
| 23 | 12.0 at 850° F. | Fe + 5% Al$_2$O$_3$ + 3% Rb$_2$O |
| 24 | ≈ 2.3, Declining at 950° F. | Fe—MoO—Al$_2$O$_3$ |

Some of the catalysts were commercially available catalysts used for purposes other than ammonia synthesis and others were freshly prepared. All of the catalysts shown in Table I had been manufactured or prepared by methods other than cogelation of iron and aluminum compounds except for catalysts 18, 22, and 23. As is indicated by the percent ammonia in the converter effluent at 900°F., none of the catalysts initially tested (with exceptions of catalysts 22 and 23) were found to have good activity for ammonia synthesis.

Referring again to the drawing the percent ammonia in the converter effluent is shown for three catalysts which were found or determined to have good activity for conversion of nitrogen plus hydrogen to ammonia. Also shown is curve A which is an equilibrium curve showing as a function of temperature the volume per cent NH$_3$ that would be formed in a mixture of nitrogen and hydrogen at a given temperature if the nitrogen and hydrogen were allowed infinite length of time in which to react. As can be seen by the equilibrium curve A, a very attractive ammonia synthesis catalyst would be obtained if an ammonia synthesis catalyst with high activity at low temperatures, for example, between 700° and 850°F., could be made. This is apparent from the equilibrium curve, which shows that a much higher amount of ammonia may be formed at a low temperature than at temperatures of, say, 950°, 1,000° or 1,100°F. The problem, however, is in obtaining a catalyst which will sufficiently speed up the kinetics of the reaction of hydrogen plus nitrogen to form ammonia at the lower temperatures, so that it is feasible to operate the catalyst at the lower temperatures, for example, below 900° or 850°F.

The procedure used in testing the various catalysts was consistent. A mixture of 3 parts hydrogen to 1 part nitrogen on a molar bases was passed through a converter at a pressure of 2,500 p.s.i.g. and a space velocity of 40,000 standard volumes of gas per hour per volume of catalyst. Essentially all the catalysts were tested at a temperature of 900°F. and several of the catalysts were tested at various temperatures as is indicated in the drawing.

As is previously indicated, curve A in the drawing is a curve indicating the equilibrium amount of ammonia at various temperatures. Curve B graphically indicates the percent NH$_3$ formed when passing the 3 to 1 hydrogen to nitrogen mixture through the converter under a pressure of 2,500 p.s.i.g. and a space velocity of 40,000. Curves C and D graphically depict the percent of ammonia by volume present in the converter effluent under the standard conditions as used to obtain curve B.

The catalyst which was used to obtain curve B is Topsoe KMIR ammonia synthesis catalyst. The Topsoe catalyst, which is a widely used commercial catalyst, is believed to be comprised of iron, alumina, potassium oxide, calcium oxide and probably some magnesium oxide and silica. Before the activity of the catalyst was obtained as indicated graphically in the drawing, the catalyst was allowed to stabilize in terms of percent ammonia conversion or percent ammonia in the converter outlet. As can be seen from the drawing, at 900°F. the commercial catalyst as shown by curve B gave an ammonia conversion of 13.5 percent for the single pass of nitrogen and hydrogen through the converter. At the same conditions but using a preferred catalyst having a composition within the scope of the new catalysts as defined in this application, a surprising and unexpectedly high conversion of 16.2 percent ammonia was obtained, that is, the percent ammonia by volume on a molar basis in the converter effluent was 16.2. The catalyst which gave the results as depicted by curve D in the Figure was prepared by cogelation of iron and aluminum compounds followed by impregnation of rubidium onto the support comprised of iron and aluminum and then followed by impregnation of about 1 weight percent platinum onto or into the Fe/Al/Rb catalyst. The ratio of Fe/Al/Rb was 100/5.3/1.4 on an atomic basis.

In order to determine how much of the improved activity might be attributed to the presence of platinum, the same catalyst except without the platinum was tested according to the standard conditions. Using this catalyst the results as graphically indicated by curve C were obtained. This catalyst gave a very good conversion of nitrogen and hydrogen to ammonia but yet the conversion was substantially below the conversion obtained using the same catalyst with platinum impregnated onto the catalyst. Thus, at 900°F. the percent ammonia in the converter effluent using the catalyst comprised of Fe/Al/Rb was 13.4, whereas 16.2 percent ammonia was formed using the same Fe/Al/Rb catalyst with the Pt added. As a confirming test (which is not graphically depicted in the drawing) a catalyst comprised of 100 parts Fe to 5.3 parts Al to 3.0 parts Rb on a gram atom basis with 1 weight percent platinum was tested under the standard conditions for ammonia synthesis. At 900°F., 16.0 percent NH$_3$ was formed. Using the same catalyst at 900°F. but without the platinum the percent ammonia obtained in the converter effluent was about 13.2. Thus approximately 17.5 percent less ammonia was formed using the catalyst with platinum versus using the same catalyst but with platinum present in or on the catalyst.

It is thus seen that platinum gives superior results when present in the ammonia synthesis catalyst. Under certain conditions the platinum may give superior results for differing types of ammonia synthesis catalyst, but it was found that with Topsoe catalyst the addition of 1 percent platinum to a prereduced Topsoe catalyst did not improve the catalytic activity of the catalyst. For example, at 900°F. in a given test run using Topsoe KMIR catalyst, 13.7 percent ammonia was obtained in the converter effluent. Using the same KMIR catalyst but with 1 weight percent platinum impregnated thereon, 12.4 percent ammonia was obtained for the single pass of the 3 to 1 hydrogen to nitrogen mixture through the ammonia converter. However, it is believed that for a catalyst prepared by cogelation of iron and aluminum compounds that hydrogenation components, such as palladium and nickel, in addition to platinum will result in a good catalyst which is in many instances better than the presently widely used commercial catalysts.

One area of particular work necessary to the further improvement of the new catalysts as disclosed in the present application is that of reducing the fouling rate obtained in using the catalyst. Fouling rates of the order of 0.01 percent ammonia per hour, that is, a decline in ammonia conversion of approximately 0.01 percent per hour, were obtained with most of the catalysts. Many presently available commercial catalysts give substantially lower fouling rates.

Although various specific embodiments of the invention have been described and shown, it is to be understood that they are meant to be illustrative only and not limiting. Certain features may be changed without departing from the spirit or essence of the invention. It is apparent that this invention has broad application to ammonia synthesis catalysts. Accordingly, the invention is not to be construed as limited to the specific embodiments illustrated but only as defined in the following claims.

I claim:

1. An ammonia synthesis catalyst comprising iron, aluminum oxide, rubidium oxide, and between 0.1 and 2.0 weight percent platinum, and wherein the atomic ratio of iron to aluminum to rubidium is between 80 and 120 atoms iron to between 4.3 and 6.3 atoms aluminum to between 1.7 and 3.7 atoms rubidium.

2. A catalyst according to claim 1 wherein the atomic ratio of iron to aluminum to rubidium is approximately 100 to 5.3 to 2.7, respectively.

3. A catalyst according to claim 1 wherein the catalyst is prepared by cogelation of iron and aluminum compounds.

4. In a process for the catalytic synthesis of ammonia, wherein $H_2$ and $N_2$ are contacted with an ammonia synthesis catalyst to catalyze the reaction of $H_2$ and $N_2$ to form ammonia, the improvement which comprises using as said ammonia synthesis catalyst the catalyst of claim 1.

5. In a process for the catalytic synthesis of ammonia, wherein $H_2$ and $N_2$ are contacted with an ammonia synthesis catalyst to catalyze the reaction of $H_2$ and $N_2$ to form ammonia, the improvement which comprises using as said ammonia synthesis catalyst the catalyst of claim 2.

* * * * *